(12) United States Patent
Tieke et al.

(10) Patent No.: US 7,423,955 B2
(45) Date of Patent: Sep. 9, 2008

(54) METHOD FOR RECORDING A LEAD-OUT ON AN OPTICAL DISC

(75) Inventors: Benno Tieke, Eindhoven (NL); Hubert Cécile François Martens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 430 days.

(21) Appl. No.: 10/549,638

(22) PCT Filed: Mar. 11, 2004

(86) PCT No.: PCT/IB2004/050225

§ 371 (c)(1),
(2), (4) Date: Sep. 20, 2005

(87) PCT Pub. No.: WO2004/086398

PCT Pub. Date: Oct. 7, 2004

(65) Prior Publication Data

US 2006/0215533 A1      Sep. 28, 2006

(30) Foreign Application Priority Data

Mar. 24, 2003   (EP)   ................... 03100756

(51) Int. Cl.
*G11B 7/007*   (2006.01)
(52) U.S. Cl. .................................. 369/275.3
(58) Field of Classification Search ........... None
See application file for complete search history.

(56) References Cited

U.S. PATENT DOCUMENTS

| | | | |
|---|---|---|---|
| 4,901,300 A | | 2/1990 | Van Der Zande et al. |
| 5,187,699 A | | 2/1993 | Raaymakers et al. |
| 5,778,257 A | * | 7/1998 | Tsukatani et al. ............. 710/74 |
| 6,091,686 A | * | 7/2000 | Caffarelli et al. .......... 369/53.24 |
| 6,369,957 B1 | | 4/2002 | Ishida |
| 2002/0020821 A1 | | 2/2002 | Van Santen et al. |
| 2002/0159376 A1 | | 10/2002 | Oksawa |
| 2003/0048733 A1 | * | 3/2003 | Heemskerk et al. ........... 369/94 |
| 2003/0063545 A1 | * | 4/2003 | Suzuki ..................... 369/59.25 |

(Continued)

FOREIGN PATENT DOCUMENTS

JP     09231613     5/1997

(Continued)

*Primary Examiner*—Andrea Wellington
*Assistant Examiner*—Michael V Battaglia
(74) *Attorney, Agent, or Firm*—Michael E. Belk

(57) ABSTRACT

A method of recording information stores lead-out information on a multilayer record carrier of an opposite track path type. A two part recording area across two layers is logically interrupted by an intermediate zone. The recording area is preceded by a lead-in zone located at the start of the first recording layer and followed by a lead-out zone located at the end of the second recording layer. An outer lead-out part and an inner lead-out part are recorded separated by an unrecorded area and together constituting the lead-out information on the second recording layer. The inner lead-out part covers a predefined radial position range corresponding to a range of radial positions used by reading devices for accessing the second recording layer during a disc loading procedure. The outer lead-out part is recorded at the end of an area of the second recording layer containing user information.

10 Claims, 4 Drawing Sheets

U.S. PATENT DOCUMENTS

Figure 2:
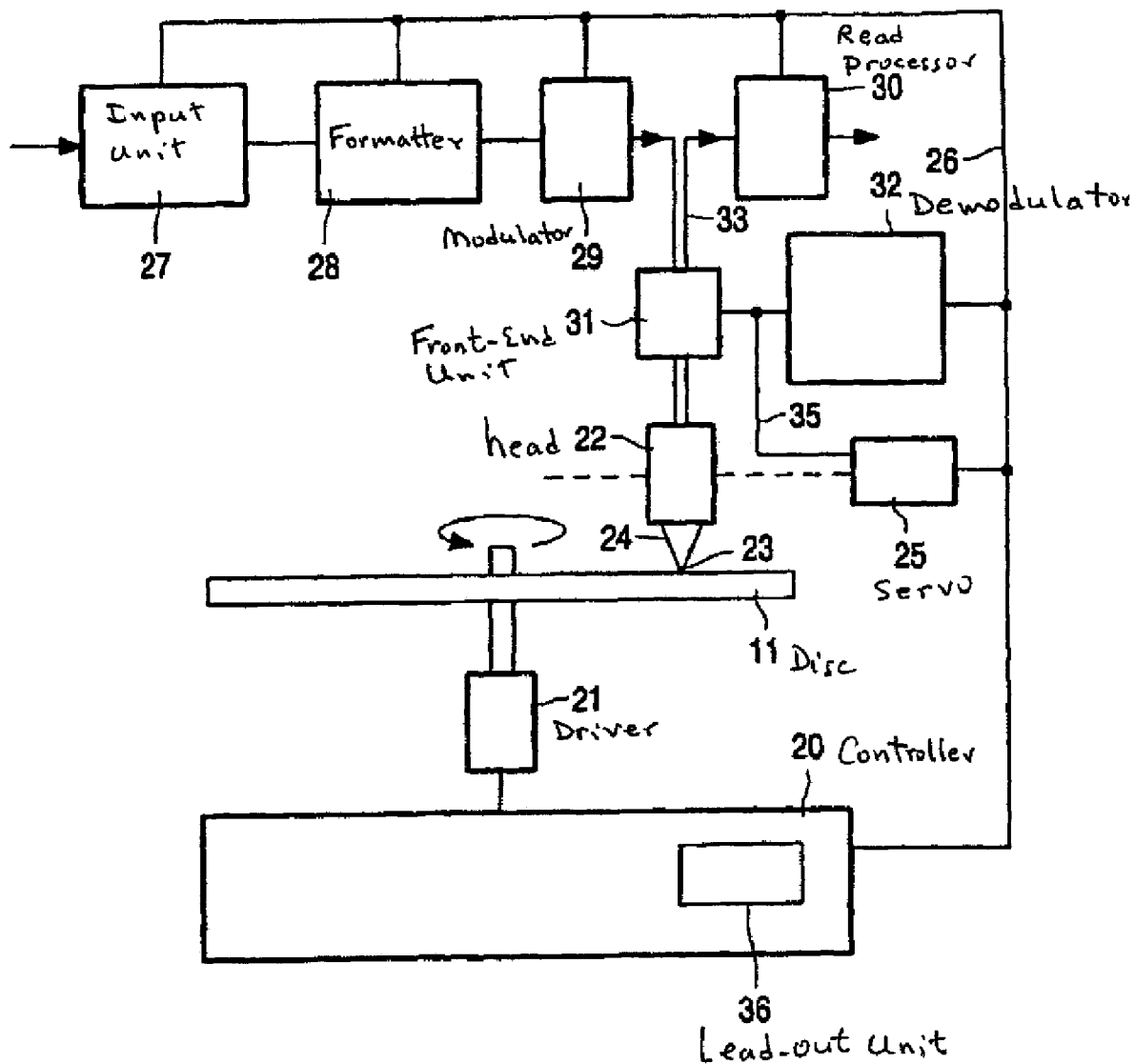

2003/0137909 A1* 7/2003 Ito et al. ............... 369/47.14
2004/0133739 A1* 7/2004 Sasaki .................... 711/112

FOREIGN PATENT DOCUMENTS

| JP | 9153233 | | 6/1997 |
|---|---|---|---|
| JP | 10255319 | | 9/1998 |
| JP | 2000067511 A | * | 3/2000 |
| JP | 2002170338 A | * | 6/2002 |
| WO | 9949504 | | 9/1999 |
| WO | 0043996 | | 7/2000 |
| WO | 2004086398 A1 | | 10/2004 |

* cited by examiner

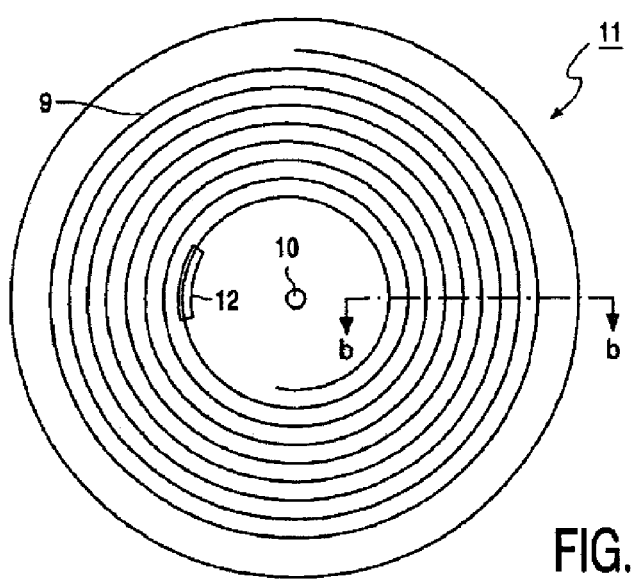
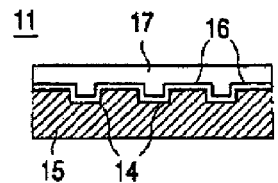
FIG. 1b
(PRIOR ART)
FIG. 1a
(PRIOR ART)
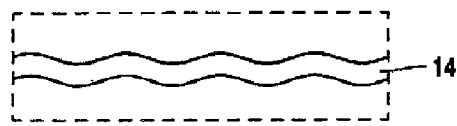
FIG. 1c
(PRIOR ART)

METHOD FOR RECORDING A LEAD-OUT ON AN OPTICAL DISC

The invention relates method of recording information on a record carrier of a writable type by writing marks in a track.

The invention further relates to a record carrier and a device for recording the record carrier.

A method for recording an optical record carrier is known from WO00/43996. The record carrier comprises a guide groove, usually called pregroove, for indicating the position of tracks in which the information is to be represented in a predefined manner by recording optically readable marks. The pregroove is meandering by a periodic excursion of the track in a transverse direction (further denoted as wobble). The wobble may be varied in period according to additional information such as addresses. A recording device is provided with a head for generating a beam of radiation for scanning the track. The marks are detected during said scanning by variations of the reflectivity of the scanned surface. The variations in intensity of the reflected radiation are detected by a main detector system. Furthermore the scanning device has auxiliary detectors for generating tracking servo signals based on the pregroove for detecting a spatial deviation of the head with respect to the track. The tracking servo signals are used to control actuators to position the head on the track. The variations in period of the wobble are detected for retrieving the auxiliary information, e.g. address information. When the writable type record carrier is to be read in a reading device the reading device may expect a fully recorded disc, in particular the second recording layer being recorded and a lead-out zone being present at the end of the recorded data. A problem of the known record carrier is that when a substantial area of the second recording layer is still unrecorded, and the user decides that the disc is to be prepared for use in such a reading device, a large area needs to be recorded causing annoying delays for the user.

Therefore it is an object of the invention to provide a method, a record carrier and a recording device for preventing delays when the record carrier needs to be prepared for use in a reading device.

According to a first aspect of the invention the object is achieved with a method of recording information by writing marks in a track on a recording layer via a beam of radiation entering through an entrance face of the record carrier, the record carrier comprising a first recording layer and a second recording layer, the first recording layer being present at a position closer to the entrance face than the second recording layer, and each recording layer comprising a pregroove pattern indicating the position of the track, the track on the first recording layer extending spirally in a first direction and the track on the second recording layer extending spirally in a second direction opposite to the first direction for constituting a two part recording area logically interrupted by an intermediate zone that physically is constituted by a first intermediate part located at the end of the first recording layer and a second intermediate part located at the start of the second recording layer, the recording area being preceded by a lead-in zone located at the start of the first recording layer and being followed by lead-out information located at the end of the second recording layer, the method comprising a lead-out recording step comprising recording an outer lead-out part and an inner lead-out part, both parts being separated by an unrecorded area and together constituting the lead-out zone on the second recording layer, the inner lead-out part being recorded at a predefined radial position range for covering a range of radial positions used by reading devices for accessing the second recording layer during a disc loading procedure, and the outer lead-out part being recorded at the end of an area of the second recording layer containing user information.

According to a second aspect of the invention the object is achieved with a record carrier as defined in claim 7. According to a third aspect of the invention the object is achieved with a recording device as defined in claim 9.

The effect of the measures is that the inner lead-out part is recorded in a relative small area of the record carrier where the reading device will access the second recording layer. Also at the end of the recorded user data there will be recorded the outer lead-out part in a relative small area. Hence recording both areas requires only a limited amount of time, because the area between the inner and out part remains unrecorded.

The invention is also based on the following recognition. The record carrier needs to be readable on existing reading devices, for example DVD (Digital Versatile Disc) players. The reading devices will perform a disc loading procedure in a predictable way; in particular each reading device is required to retrieve predefined control data from a known area on the first recording layer, because the record carrier is to be formatted according to a predefined standard. The inventors have seen that in such a loading procedure a reading test for the second recording layer is to be expected, and will take place at a predictable radial position, in particular around the radial position corresponding to said control data on the first recording layer. Hence in a practical standardized environment a predefined range which is necessary to be recorded on the second layer can be determined, and only that area needs to be recorded constituting an inner lead-out part. By further recording the outer lead-out part at the end of the recorded user data, the lead-out zone is effectively split in two recorded parts having a substantial unrecorded area in between. The unrecorded area will not hamper a reading device in any way.

In an embodiment of the method the lead-out recording step comprises an initial lead-out step for recording the inner lead-out part during initializing the record carrier for use in recording or reading devices, and a finalizing lead-out step for, after recording user information, recording the outer lead-out part. The finalizing lead-out step may take place during finalizing the record carrier for use in read-only devices. This has the advantage that at the end of a recording session only the outer lead-out part still needs to be recorded, which further reduces the delay for the user.

Further preferred embodiments of the method and device according to the invention are given in the further claims.

Figure 3:
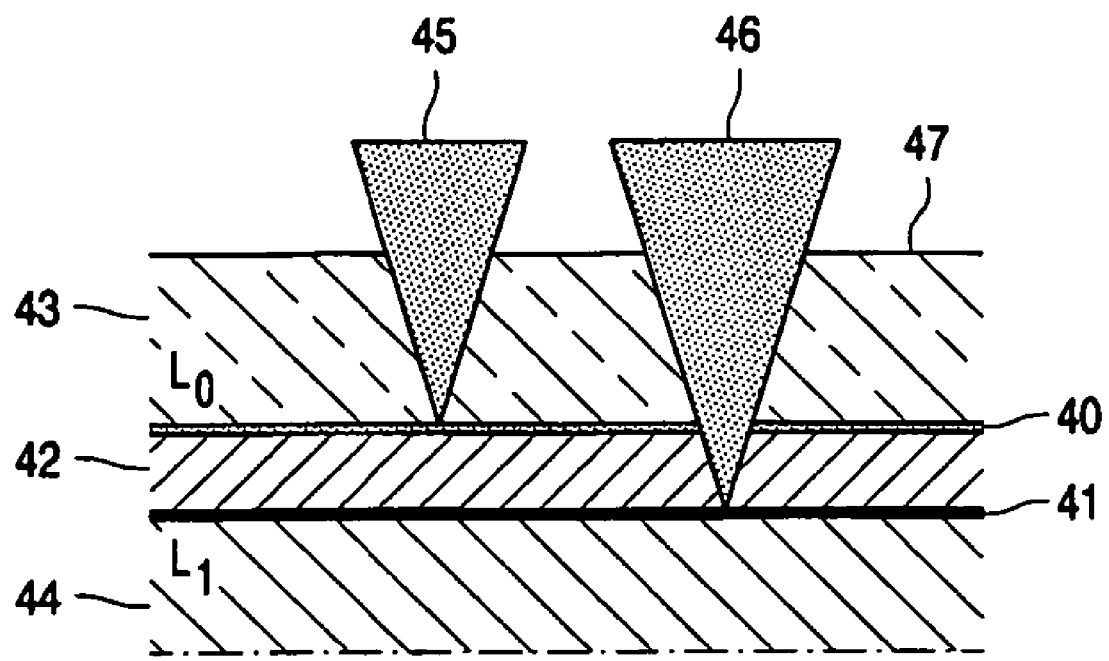
Figure 4:
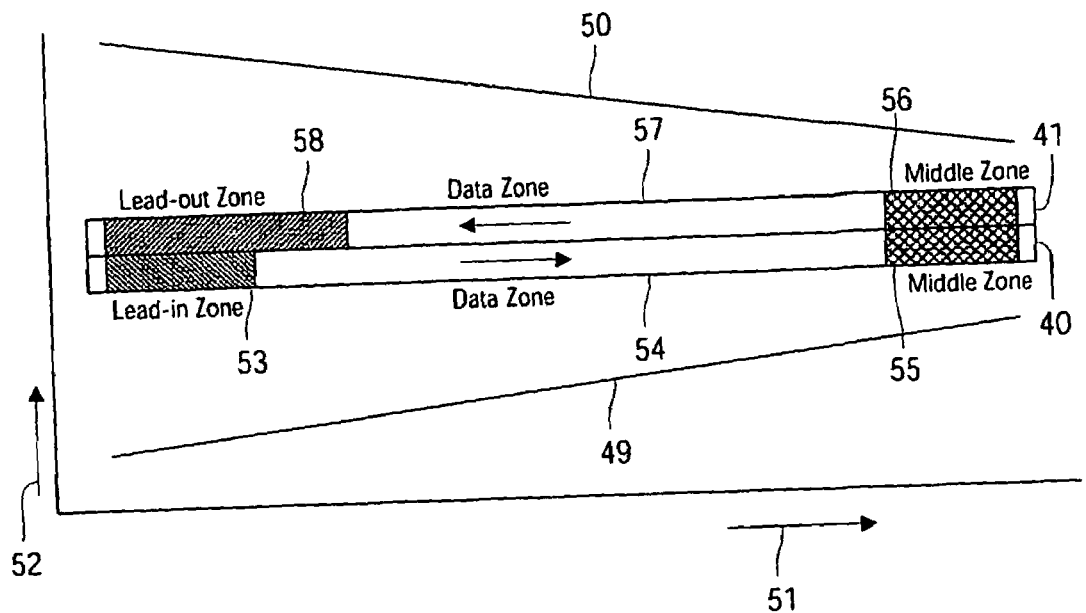
Figure 5:
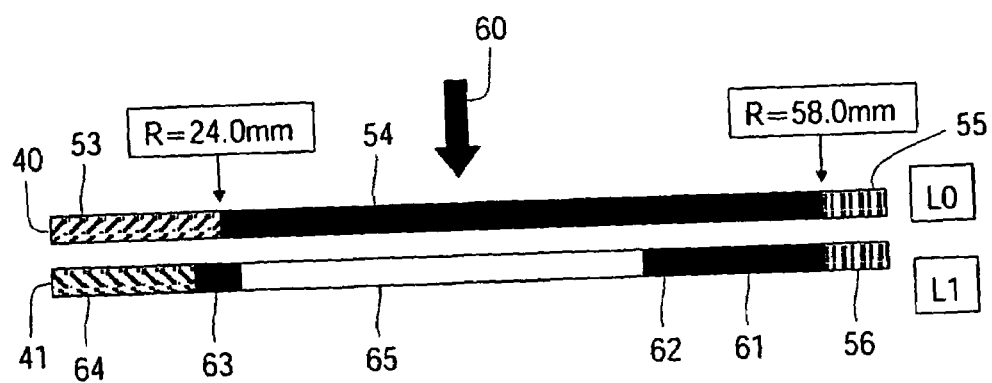

These and other aspects of the invention will be apparent from and elucidated further with reference to the embodiments described by way of example in the following description and with reference to the accompanying drawings, in which FIG. 1*a* shows a disc-shaped record carrier (top view), FIG. 1*b* shows a cross-section taken of the record carrier, FIG. 1*c* shows an example of a wobble of the track, FIG. 2 shows a recording device having a lead-out recording function, FIG. 3 shows a multilayer optical disc, FIG. 4 shows schematically an opposite track path record carrier, and FIG. 5 shows a lead out recorded in two parts.

In the Figures, elements which correspond to elements already described have the same reference numerals.

FIG. 1*a* shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. Examples of a recordable disc are the CD-R and CD-RW, and the DVD+RW. The track 9 on the recordable type of record carrier is indicated by a pre-track structure provided during manufacture of the blank record carrier, for example a pregroove. Recorded information is represented on the information layer by optically detectable marks recorded along the track. The marks are constituted by variations of a first physical parameter and thereby have different optical properties than their surroundings. The marks are detectable by variations in the reflected beam, e.g. variations in reflection.

FIG. 1b is a cross-section taken along the line b-b of the record carrier 11 of the recordable type, in which a transparent substrate 15 is provided with a recording layer 16 and a protective layer 17. The pre-track structure is constituted, for example, by a pregroove 14 which enables a read/write head to follow the track 9 during scanning. The pregroove 14 may be implemented as an indentation or an elevation, or may consist of a material having a different optical property than the material of the pregroove. The pregroove enables a read/write head to follow the track 9 during scanning. A pre-track structure may also be formed by regularly spread sub-tracks or pre-pits which periodically cause servo signals to occur. The record carrier may be intended to carry real-time information, for example video or audio information, or other information, such as computer data.

FIG. 1c shows an example of a wobble of the track. The Figure shows a periodic variation of the lateral position of the track, also called wobble. The variations cause an additional signal to arise in auxiliary detectors, e.g. in the push-pull channel generated by partial detectors in the central spot in a head of a scanning device. The wobble is, for example, frequency modulated and position information is encoded in the modulation. A comprehensive description of the prior art wobble as shown in FIG. 1c in a writable CD system comprising disc information encoded in such a manner can be found in U.S. Pat. No. 4,901,300 (PHN 12.398) and U.S. Pat. No. 5,187,699 (PHQ 88.002).

During readout by scanning the wobble modulation is detectable via a second type of variations of the radiation, such as variation of intensity in the cross section of the reflected beam detectable by detector segments or additional detectors for generating tracking servo signals. Detecting the wobble for a tracking servo system is well known from the above mentioned CD-R and CD-RW system. The wobble modulation is used to encode physical addresses and control information, for example as in the DVD+RW system and in WO00/43996, The method for recording lead-out information according to the invention relates a multilayer record carrier. It is noted that 'upper' (and 'lower') layer indicates the layer closest to (and a layer farther away from) the entrance face of the laser, which in practice may be the top or bottom the record carrier depending on the location of the laser.

In an embodiment the record carrier has a pre-track modulation for encoding lead-out control information indicating that the lead-out information is to be recorded in two parts, for example in a predefined control area as is schematically indicated by area 12 in FIG. 1a. The lead-out control information may be encoded in ADIP as described in WO00/43996. Alternatively the lead-out control information is encoded in pre-pits like in DVD-RW or in a pre-embossed data area using pits and land like in a read-only disc. The lead-out control information indicates the recording of the lead-out in two parts for performing a lead-out recording step comprising recording an outer lead-out part and an inner lead-out part as described below, for example the location of an inner lead-out part of a lead-out zone on the lower recording layer.

FIG. 2 shows a recording device having a lead-out recording function. The device is provided with means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The error signals 35 are also coupled to a pre-track demodulation unit 32 for retrieving the physical addresses and other control information from the pre-track pattern such as wobble modulation or pre-pits. The main scanning signal 33 is processed by read processing unit 30 of a usual type including a demodulator, deformatter and output unit to retrieve the information.

The device is provided with recording means for recording information on a record carrier of a writable or re-writable type, for example CD-R or CD-RW, or DVD+RW or BD. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the beam of radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 controls the recording and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. According to the invention the control unit has a lead-out unit 36 for recording of a lead-out in two parts as described below. In an embodiment the lead-out unit performs the retrieving the lead-out control information from the pregroove via the wobble demodulation unit 32.

FIG. 3 shows a multilayer optical disc. L0 is a first recording layer 40 and L1 is a second recording layer 41. A first transparent layer 43 covers the first recording layer, a spacer layer 42 separates both recording layers 40,41 and a substrate layer 44 is shown below the second recording layer 41. The first recording layer 40 is located at a position closer to an entrance face 47 of the record carrier than the second recording layer 41. A laser beam is shown in a first state 45 focused on the L0 layer and the laser beam is shown in a second state 46 focused at the L1 layer. Multilayer discs are already available as read-only pre-recorded discs, such as DVD-ROM or DVD-Video. A dual layer DVD+R disc has recently been suggested, which disc should preferably be compatible with the dual layer DVD-ROM standard. The reflection levels of both layers are >18%. The L0 layer has a transmission around 50-70%. A spacer layer separates the layers with a typical thickness between 30 and 60 µm. The L1 layer has a high reflection and needs to be very sensitive. Also rewritable dual-layer discs are proposed. The L0 layer has a transmission around 40-60%. The effective reflection of both layers is typically 7% although lower and higher values are possible (3%-18%). Writable and rewritable optical storage media having 3 or more recording layers are considered also.

Due to the required compatibility with existing read-only standardized record carriers, like the DVD-ROM standard, for a DVD-type dual-layer recordable (or rewritable) disc there are two options possible for the layout of the disc. These two options are referred to as 'parallel track path' (PTP) and 'opposite track path' (OTP), which indicates the direction of the spiral in both layers. In PTP discs there is one information zone per layer (two in total), while in OTP discs there is one information zone extending over the two layers. In the DVD ROM standard for dual-layer discs in opposite-track-path (OTP) mode, there is defined one information zone that extends over the two layers.

FIG. 4 shows schematically an opposite track path record carrier. Horizontally arrow 51 indicates the radial position (increasing outward) and vertically arrow 52 indicates the physical addresses, i.e. sector numbers. Curve 49 indicates the increasing addresses on the L0 layer 40 going outward, while curve 50 indicates the addresses on the L1 layer 41 further increasing going inward. The recording zone have a first data zone 54 on L0 and a second part 57 on L1, interrupted by a middle zone constituted by a first intermediate part 55 at the end of the recording L0 layer 40 and a second intermediate part 56 at the beginning (in track direction) of the L1 recording layer 41. The arrows in the data zones 54,57 indicate the spiral direction. The recording zone is preceded by a lead-in zone 53 at the beginning of the L0 recording layer and concluded by a lead-out zone 58 at the end of the L1 recording layer. It is noted that a multilayer disc having more than two layers may have a third intermediate area at the end of the second recording layer and a fourth intermediate area at the beginning of the third recording layer, and so on. The lead-out zone concludes the last recording layer. In the further text "lower layer" or "L1 layer" of a dual layer disc is used for explaining the invention, which is deemed to include the lower layers in the event of discs having more than two layers.

In general a standardized DVD player expects data on both layers everywhere on a dual layer DVD. In the case of a dual layer DVD+R, the requirement implies that a recorded dual layer DVD+R should also contain data everywhere, i.e. both layers should be completely filled with data. In the case of a recording that does not make use of the total available capacity of the disc the remaining empty part of the disc should, in principle, be filled with a lead-out containing no user data in order to be 100% compatible with dual-layer DVD-ROM. Filling is unwanted because it is a very time consuming procedure resulting in an unacceptable long formatting and/or finalization time after recording the disc. In a single layer DVD+R, to avoid filling a remaining empty space, a lead-out of limited length (320 ECC blocks) at the end of the data zone is defined leaving the remainder of the disc empty. However, in the dual-layer case, leaving the remainder of the disc empty, i.e. especially (large parts of) the deeper lying layer L1, creates the problem that a DVD player trying to access this layer L1 will fail since it does not encounter any data. Accessing both layers L0 and L1 can for instance be considered a typical situation in a DVD player at the beginning of the read-out of a newly inserted disc to e.g. adjust parameters like focus offset for both layers. A failure in reading layer L1 would result in a total failure to read such a disc, even if there is no user data at all on layer L1.

According to the invention the lead-out zone is recorded as an outer lead-out part and an inner lead-out part, both parts being separated by an unrecorded area and together constituting a quasi continuous lead-out zone on the L1 recording layer. The inner lead-out part covers a predefined radial position range corresponding to a range of radial positions used by reading devices for accessing the second recording layer during a disc loading procedure. The outer lead-out part is recorded at the end of the user data on the L1 recording layer. Hence the outer lead-out part defines the end of the recorded data and forces a DVD player to stop read out when the end of the user data is reached. The outer lead-out part can be limited in size (for DVD typically 320 ECC blocks). The inner lead-out part is written on layer L1 at the radial inner side of the disc in a zone reserved for the lead-out. The inner lead-out part may start somewhat earlier at the end of the data zone just before the predefined lead-out zone. The inner lead-out part is important in case the DVD player performs a layer jump to access L1, e.g. in the beginning of the read-out.

In an embodiment the inner lead-out part is already recorded during the first recording session, e.g. by a separate initialization of the disc or as a background writing procedure. This reduces the time needed for finalization of the disc at the end of a recording session. It is advantageous to record lead-out data during initialization also for other reasons such as creating a focusing area on the L1 recording layer. The initialization is performed before the start of the recording process. The recording of the inner lead-out part could also be performed in a background mode during recording of data, for example during recording variable rate video some time will be available for background recording tasks. This has the advantage of reducing the initialization time needed before recording can be started.

FIG. 5 shows a lead out recorded in two parts. The recording zone have a first data zone 54 having recorded user data on the L0 layer 40 and a second part 60 on the L1 layer 41, interrupted by a middle zone constituted by a first intermediate part 55 at the end of the recording L0 layer 40 and a second intermediate part 56 at the beginning (in track direction) of the L1 recording layer 41. The recording zone is preceded by a lead-in zone 53 at the beginning of the L0 recording layer and concluded by a lead-out zone 64 at the end of the L1 recording layer. The lead-in zone 53 is located on L0 and ranges from radius 22.6 mm to radius 24.0 mm. The lead-in must contain control information and should always be present when the discs are to be read by a standard DVD player. However the lead-out zone 64 has no prescribed content. At the end of the recorded user data in the data zone 61 on the L1 layer a first lead-out part 62 is recorded, which contains the lead-out data indicating to the DVD player that no more data is recorded. DVD players also access the L1 layer during a start-up procedure when detecting the type of a disc just inserted. The DVD player will try to access the L1 layer to determine if a dual layer disc has been inserted. The access during the startup takes place around a predetermined radial position, in particular around the end of the lead-in zone. FIG. 5 shows a second lead-out part 63 recorded around the access point of DVD players, in particular around a radial position of R=24 mm as indicated. In between the first lead-out part 62 and the second lead-out part 63 there is located an unrecorded area 65. The unrecorded area 65 may have a substantial length if the user decides to stop recording when only a small part of the second recording layer contains user data. For a disc having more than two layers additional lead-out parts may be recorded on corresponding radial positions. By recording the lead out in two or more separate parts, a considerable reduction in formatting or finalization of a partly recorded dual layer DVD+R can be achieved while still providing maximum compatibility with read-out in existing DVD players.

In a practical embodiment a dual layer DVD+R has a data zone in L0 starting at radius 24.000 mm and the data zone in L1 ends at radius 24.000 mm; next to the data zone to the inside a lead-out zone in L1 can be present. At the same radial position as this lead-out zone in L1, the lead-in zone with control data is located on layer L0. Common DVD players do access layer L1 (for e.g. focus offset calibration) by a direct layer jump at the radial position where the control data on layer L0 are located (close to radius 24.000 mm). Hence for the inner lead-out part it is sufficient to record lead-out data in the vicinity of this radius. To determine the size of the lead-out data to be recorded one has to account for e.g. typical eccentricity values between L0 and L1. In a practical embodiment the inner lead-out part is recorded from 23.80 to 24.20 mm.

In an embodiment in addition to a recorded area near radius 24 mm, further lead-out data are recorded at the end of the user data, which terminate the recorded area. Furthermore, in an embodiment the lead-out recording step comprises a step of writing filling data in additional parts of track on other radial positions of the record carrier, in particular the additional parts being located in the intermediate parts. For compatibility with read-only discs other areas of the record carrier may be required to be recorded. Hence filling data, e.g. data blocks filled with zero data or prescribed values according to a standard, are recorded in the additional parts of the track where accessing of the lower layer is expected. For example during recording real-time data like video it may not be possible to (fully) record the intermediate parts, and the playback device may also try to access the other layer(s) in the intermediate zone. Hence when the recording is terminated by writing lead-out parts, the intermediate parts are additionally recorded by writing filling data, at least partially in the radial area where accessing of the lower layer is expected.

Although the invention has been mainly explained by embodiments using optical discs based on change of reflection, the invention is also suitable for other record carriers such as rectangular optical cards, magneto-optical discs or any other type of information storage system that has a pre-applied pattern on a writable record carrier. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A method of recording information on a record carrier of a writable type by writing marks in a track on a recording layer via a beam of radiation entering through an entrance face of the record carrier, the record carrier comprising a first recording layer and a second recording layer, the first recording layer being present at a position closer to the entrance face than the second recording layer, and the track on the first recording layer extending spirally in a first direction and the track on the second recording layer extending spirally in a second direction opposite to the first direction for constituting a two part recording area logically interrupted by an intermediate zone that physically is constituted by a first intermediate part located at the end of the first recording layer and a second intermediate part located at the start of the second recording layer, the recording area being preceded by a lead-in zone located at the start of the first recording layer and being followed by lead-out information located at the end of the second recording layer, the method comprising a lead-out recording step comprising recording an outer lead-out part and an inner lead-out part, both parts being separated by an unrecorded area and together constituting a lead-out zone on the second recording layer, the inner lead-out part being recorded at a predefined radial position range for covering a range of radial positions used by reading devices for accessing the second recording layer during a disc loading procedure, and the outer lead-out part being recorded at the end of an area of the second recording layer containing user information.

2. The method as claimed in claim 1, wherein the lead-out recording step comprises an initial lead-out step for recording the inner lead-out part during initializing the record carrier for use in recording or reading devices, and a finalizing lead-out step for, after recording user information, recording the outer lead-out part.

3. The method as claimed in claim 2, wherein the initial lead-out recording step is performed in a background mode during said recording of user information.

4. The method as claimed in claim 1, wherein the lead-in zone comprises control data to be accessed during the disc loading procedure, and said predefined radial position range corresponds to a range of radial positions where the control data is located.

5. The method as claimed in claim 4, wherein the record carrier is an optical disc and said predefined radial position range is located close to and substantially inward from a radius of 24 mm.

6. The method as claimed in claim 1, wherein the lead-out recording step comprises a step of writing filling data in additional parts of track on other radial positions of the record carrier, in particular the additional parts being located in the intermediate parts.

7. A record carrier of a writable type for recording information by writing marks in a track on a recording layer via a beam of radiation entering through an entrance face of the record carrier, the record carrier comprising a first recording layer and a second recording layer, the first recording layer being present at a position closer to the entrance face than the second recording layer, and each recording layer comprising a pre-track pattern indicating the position of the track, the track on the first recording layer extending spirally in a first direction and the track on the second recording layer extending spirally in a second direction opposite to the first direction for constituting a two part recording area logically interrupted by an intermediate zone that physically is constituted by a first intermediate part located at the end of the first recording layer and a second intermediate part located at the start of the second recording layer, the recording area being preceded by a lead-in zone located at the start of the first recording layer and being followed by lead-out information located at the end of the second recording layer, the record carrier comprising lead-out control information encoded in the pre-track pattern for performing a lead-out recording step comprising recording an outer lead-out part and an inner lead-out part, both parts being separated by an unrecorded area and together constituting a lead-out zone on the second recording layer, the inner lead-out part being recorded at a predefined radial position range for covering a range of radial positions used by reading devices for accessing the second recording layer during a disc loading procedure, and the outer lead-out part being recorded at the end of an area of the second recording layer containing user information.

8. The record carrier as claimed in claim 7, wherein the lead-out control information indicates the location of an inner lead-out part of the lead-out zone on the second recording layer.

9. A device for recording information on a record carrier of a writable type by writing marks in a track on a recording layer via a beam of radiation entering through an entrance face of the record carrier, the record carrier comprising a first recording layer and a second recording layer, the first recording layer being present at a position closer to the entrance face than the second recording layer, and the track on the first recording layer extending spirally in a first direction and the track on the second recording layer extending spirally in a second direction opposite to the first direction for constituting a two part recording area logically interrupted by an intermediate zone that physically is constituted by a first intermediate part located at the end of the first recording layer and a second intermediate part located at the start of the second recording layer, the recording area being preceded by a lead-in zone located at the start of the first recording layer and being followed by lead-out information located at the end of the second recording layer, the device comprising a head for providing the beam, and a control unit comprising lead-out means for recording an outer lead-out part and an inner lead-out part, both parts being separated by an unrecorded area and together constituting a lead-out zone on the second recording layer, the inner lead-out part being recorded at a predefined radial position range for covering a range of radial positions used by reading devices for accessing the second recording layer during a disc loading procedure, and the outer lead-out part being recorded at the end of an area of the second recording layer containing user information.

10. The device as claimed in claim 9, wherein the device comprises a pre-track demodulation unit for retrieving lead-out control information from a pre-track pattern, the lead-out control information indicating the location of an inner lead-out part of the lead-out zone on the second recording layer.

* * * * *